(12) United States Patent
Choiniere et al.

(10) Patent No.: US 9,541,573 B2
(45) Date of Patent: Jan. 10, 2017

(54) MOVEMENT COMPENSATION OF FIREARMS

(71) Applicant: BAE SYSTEMS INFORMATION AND ELECTRONIC SYSTEMS INTEGRATION INC., Nashua, NH (US)

(72) Inventors: Michael J. Choiniere, Merrimack, NH (US); John P. Thornton, Nashua, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 0 days.

(21) Appl. No.: 14/837,022

(22) Filed: Aug. 27, 2015

(65) Prior Publication Data

US 2016/0061550 A1    Mar. 3, 2016

Related U.S. Application Data

(60) Provisional application No. 62/042,407, filed on Aug. 27, 2014.

(51) Int. Cl.
| | | |
|---|---|---|
| *G01P 15/08* | (2006.01) | |
| *F41A 19/66* | (2006.01) | |
| *F41G 1/46* | (2006.01) | |

(52) U.S. Cl.
CPC ............. *G01P 15/08* (2013.01); *F41A 19/66* (2013.01); *F41G 1/46* (2013.01)

(58) Field of Classification Search
CPC ............. G01P 15/08; F41A 19/66; F41G 1/46
USPC 42/69.01, 70.09, 97, 115, 94, 120; 89/41.21
See application file for complete search history.

(56) References Cited

U.S. PATENT DOCUMENTS

| | | | | |
|---|---|---|---|---|
| 4,011,789 A | * | 3/1977 | Bresee, Jr. | F41G 3/065 235/404 |
| 9,222,754 B2 | * | 12/2015 | Lupher | F41G 1/38 |
| 2012/0297658 A1 | * | 11/2012 | Lupher | F41A 17/06 42/69.01 |
| 2013/0298438 A1 | * | 11/2013 | Lowrey, III | F41C 27/22 42/69.01 |
| 2014/0360072 A1 | * | 12/2014 | Lupher | F41G 1/38 42/69.01 |
| 2014/0360081 A1 | * | 12/2014 | Lupher | F41G 1/38 42/120 |
| 2015/0143731 A1 | * | 5/2015 | Lupher | F41A 17/06 42/69.01 |
| 2015/0211828 A1 | * | 7/2015 | Lupher | F41A 17/06 42/69.01 |

(Continued)

*Primary Examiner* — John D Cooper
(74) *Attorney, Agent, or Firm* — Davis & Bujold, PLLC; Daniel J. Long

(57) ABSTRACT

In an example, the firearm includes a firearm sight and an inertial measurement unit (IMU) mounted on the firearm sight. The IMU configured to determine an azimuth jitter and an elevation jitter corresponding to a movement of the firearm, compute an average response of the azimuth jitter and an average response of the elevation jitter, and generate an output signal to compensate for the movement of the firearm based on the average response of the azimuth jitter and the average response of the elevation jitter. The firearm further includes a firing actuation unit communicatively coupled to the IMU to delay a fire command based on the output signal.

13 Claims, 5 Drawing Sheets

(56) References Cited

U.S. PATENT DOCUMENTS

2016/0047617 A1\* 2/2016 DeGidio ................ F41A 19/08
                                                      42/69.01
2016/0061549 A1\* 3/2016 Patterson ............... F41A 17/56
                                                      42/69.01

\* cited by examiner

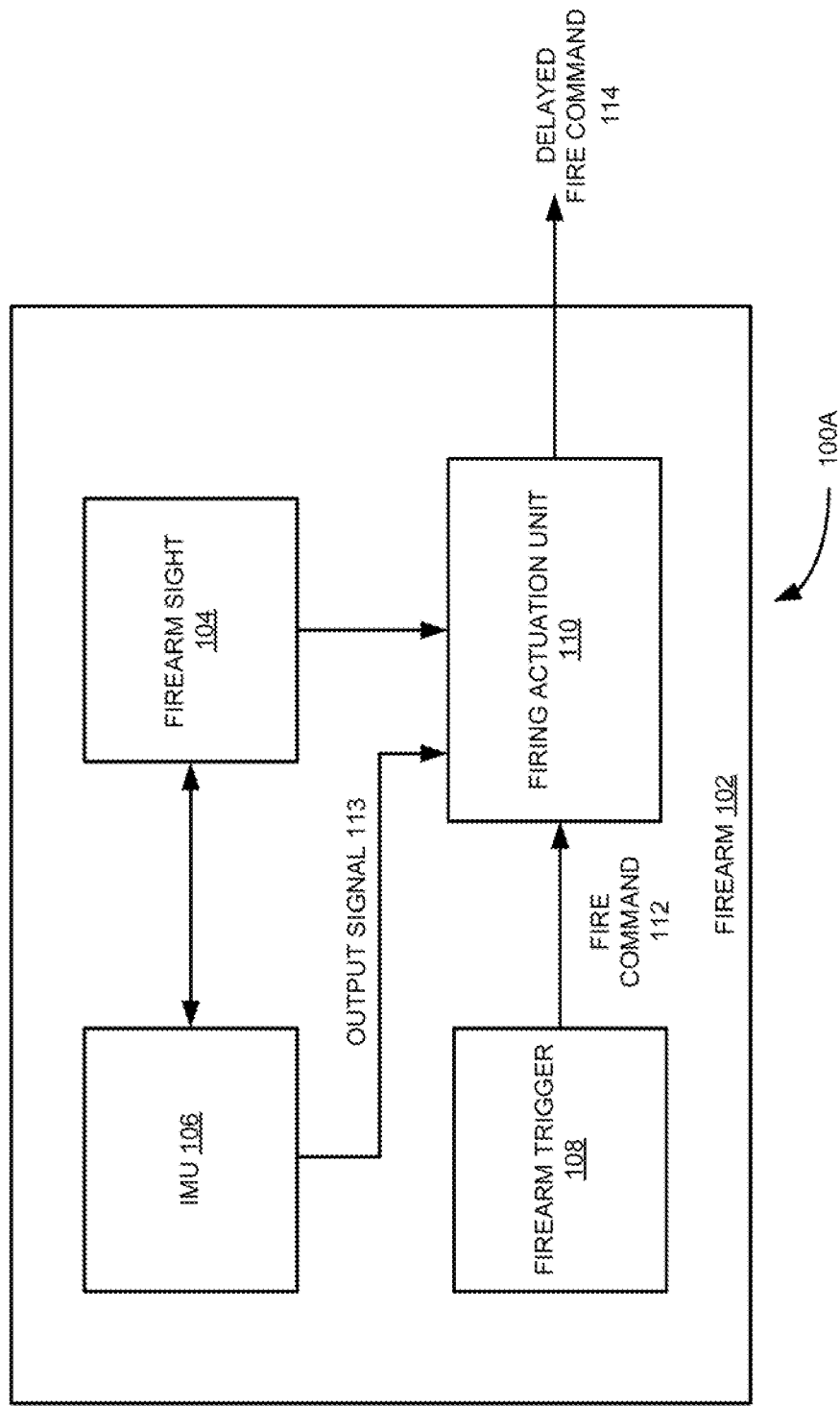

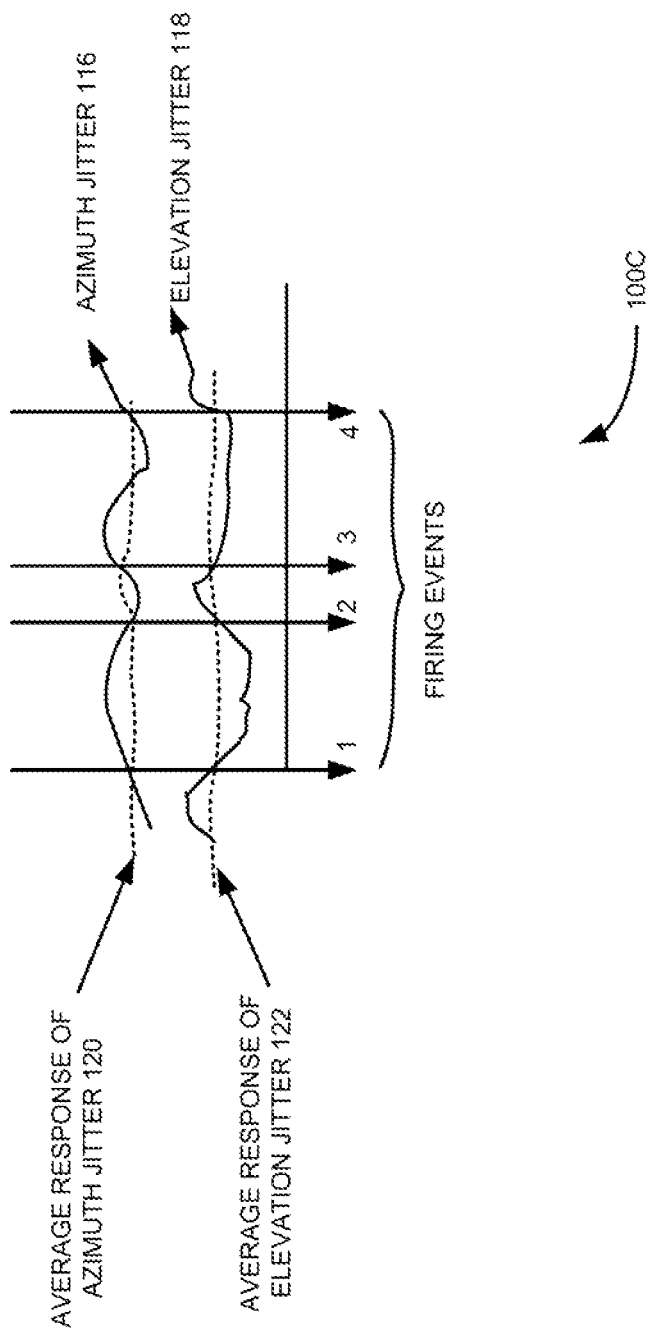

MOVEMENT COMPENSATION OF FIREARMS

CROSS-REFERENCE TO RELATED APPLICATIONS

This Application claims rights under 35 USC §119(e) from U.S. Application Ser. No. 62/042,407, titled "METHOD AND APPARATUS FOR REMOVING JITTER AND TRIGGER SQUEEZE TO IMPROVE RIFLE MARKSMANSHIP" filed on Aug. 27, 2014, the contents of which are incorporated herein by reference.

BACKGROUND OF THE INVENTION

Field of the Invention

The present invention relates generally to aiming systems in a firearm/weapon. More specifically, the present invention relates to mechanisms for increasing a target accuracy of the firearm by compensating for movements of the firearm.

Brief Description of Related Art

In the field of weaponry, indirect firing may refer to aiming and firing at a target by an aimer. Calculations, for improving the accuracy of the firing, may be done using azimuth and elevation angles of the weapon in use. Further, a calculated set of firing data may be applied on the azimuth and elevation sights and the sights may be laid down for the purpose of firing. The azimuth and the elevation angles of the weapon can be dependent on the angle at which an aimer holds the weapon. In an event where the weapon moves due to natural movements of the aimer such as breathing, muscle fatigue, continuous compensation for weight of the weapon, movement due to wind, and the like, the azimuth and the elevation angles of the weapon may be changed abruptly, resulting in a jitter. Due to the jitter, bullets fired from the weapon may not accurately reach the target when the aimer moves to squeeze the trigger.

SUMMARY OF THE INVENTION

A system and method for improving a target accuracy of a firearm is disclosed. According to one aspect of present invention, the firearm includes a firearm sight. The firearm further includes an inertial measurement unit (IMU) mounted on the firearm sight. The IMU determines an azimuth jitter and an elevation jitter corresponding to a movement of the firearm. Further, the IMU computes an average response of the azimuth jitter and an average response of the elevation jitter. Furthermore, the IMU generates an output signal to compensate for the movement of the firearm based on the average response of the azimuth jitter and the average response of the elevation jitter. Additionally, the firearm includes a firing actuation unit that is communicatively coupled to the IMU to delay a fire command of the firearm based on the output signal.

According to another aspect of the present invention, an inertial measurement unit (IMU) mounted on a firearm sight is provided. Further, an azimuth jitter and an elevation jitter associated with the movement of the firearm are determined by the IMU. Furthermore, an average response of the azimuth jitter and an average response of the elevation jitter are computed by the IMU. A fire command is delayed to compensate for the movement of the firearm, based on the average response of the azimuth jitter and the average response of the elevation jitter. In one example, the fire command is delayed by actuating firing of the firearm when the average response of the azimuth jitter and the average response of the elevation jitter substantially coincide with the azimuth jitter and the elevation jitter, respectively.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

FIG. 1A is an example block diagram of a firearm including an inertial measurement unit (IMU);

FIG. 1C is an example graphical representation showing firing events of the firearm after compensating for the movement of the firearm;

DETAILED DESCRIPTION OF THE INVENTION

Figure 1B:
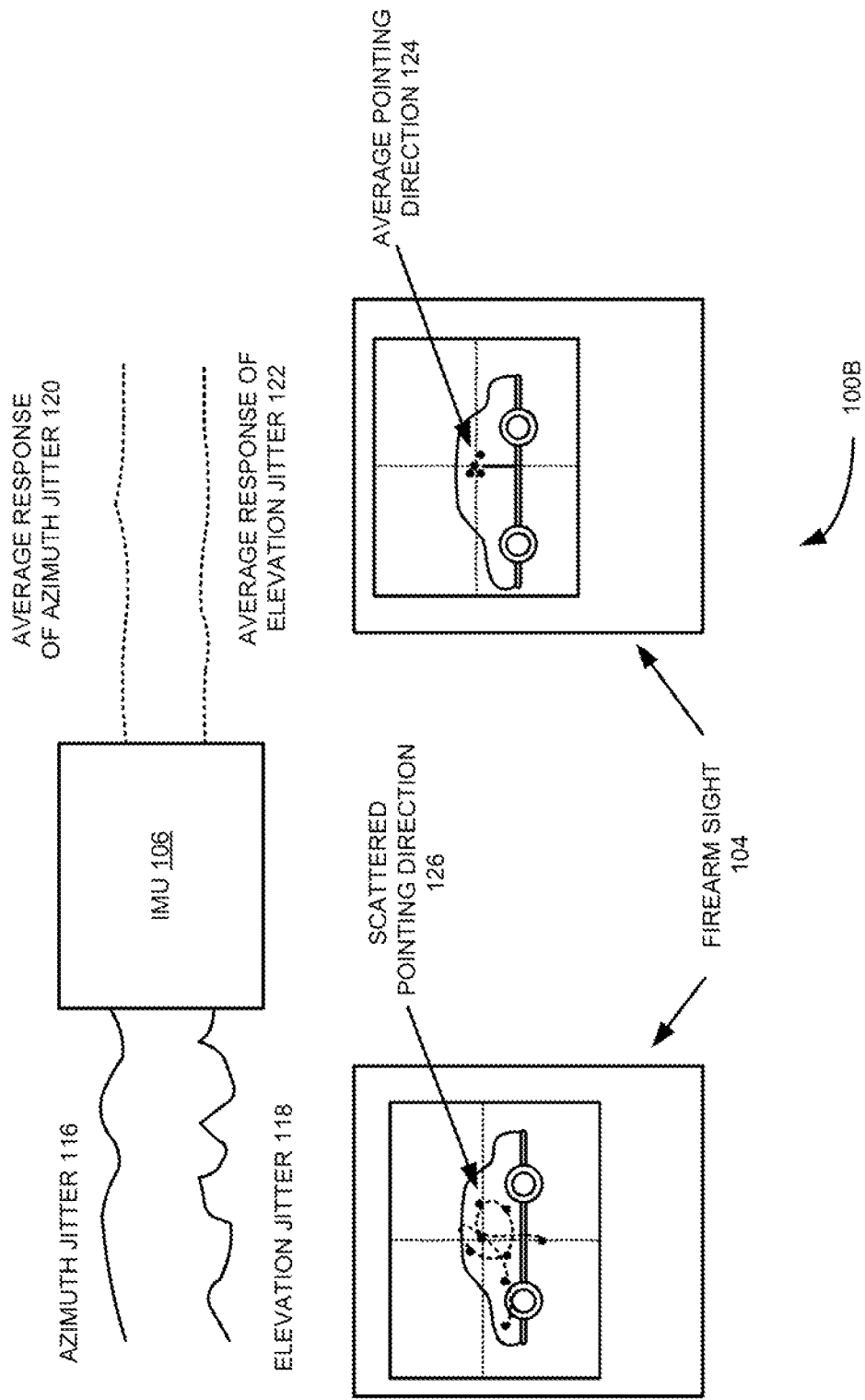
FIG. 1B illustrates an example schematic showing an average pointing direction upon processing an azimuth jitter and an elevation jitter by the IMU.

The exemplary embodiments described herein in detail for illustrative purposes are subject to many variations in structure and design. Disclosed is a technique to compensate for loss of target accuracy due to movements of the firearm. Example firearm may include a rifle, pistol, handgun, shotgun, muzzle loader, air gun, and the like. The movement of the firearm is usually caused during squeezing a trigger of the firearm by an aimer. Additionally the movement can also be caused due to breathing vibrations of the aimer, muscle fatigue of the aimer, continuous compensation for weight of the firearm, and wind. The movement of the firearm may result in an azimuth jitter and an elevation jitter of the firearm. For example, the azimuth jitter and the elevation jitter can be computed based on an azimuth angle and an elevation angle resulted due to movement of the firearm.

The azimuth angle may refer to an angle by which a horizontal projection of a bore axis of the firearm is deviated from the north. The horizontal projection is on a horizontal plane on which the firearm is situated. The azimuth angle may be alternatively referred as a weapon's horizontal firing angle or gun azimuth. The bore axis may be an axis passing through a bore of the firearm, from where a bullet is fired. Further, the elevation angle may refer to a vertical angle between the bore axis of the firearm and the horizontal plane. The elevation angle is also known as a weapon's vertical firing angle or gun elevation. The azimuth angle and the elevation angle may be referred to as input firing angles of the firearm.

Due to breathing of the aimer of the firearm, muscle fatigue of the aimer, weight of the firearm, and/or lateral wind, the firearm tends to move from a firing position. As a result, the azimuth angle and the elevation angle of the firearm tend to fluctuate. Fluctuations of the azimuth angle and the elevation angle may create an azimuth jitter and an elevation jitter. Aforementioned jitter in the input firing angles creates a loss of target accuracy. Examples described herein provide an enhanced system and method for compensating for movements of the firearm, such that the target accuracy is maintained.

FIG. 1A depicts an example block diagram 100A of a firearm 102 including inertial measurement unit (IMU) 106 to compensate for a movement of the firearm 102. In example shown in FIG. 1A, the firearm 102 includes a firearm sight 104, the IMU 106, a firearm trigger 108, and a firing actuation unit 110. The firearm sight 104 may be a device used to align or set an aiming point of the firearm 102 towards a target. Example firearm sight 104 may include optical devices, such as telescopic sights and reflector sights, which allow the user/aimer to see an image of an aligned aiming point in the same focus as the target. Further, the firearm 102 can also include devices, such as laser range finders, infra-red marker, and the like (not shown), to project the aiming point on to the target which can be viewed through the firearm sight 104.

In one example, the IMU 106 may be mounted on the firearm sight 104. The IMU 106 may include accelerometer sensors, gyroscopes, and associated electronics that maintain a coordinate frame and measure distances traveled to each coordinate axis. For example, the accelerometers sense the movement of the firearm and the gyroscopes give the accelerometers a reference point that detects the actual movement. For example, the movement of the firearm 102 may be caused due to parameters such as breathing of aimer, muscle fatigue of the aimer, continuous compensation for weight of the firearm, wind, and the like.

In operation, the IMU 106 may determine an azimuth jitter and an elevation jitter corresponding to the movement of the firearm 102. In one example, the IMU 106 may detect azimuth angle and an elevation angle that are caused due to movement of the firearm 102 from the actual firing position and determine the azimuth jitter and the elevation jitter based on the azimuth angle and the elevation angle of the firearm 102, respectively.

Further, the IMU 106 computes an average response of the azimuth jitter and an average response of the elevation jitter. The firearm sight 104 may display an average pointing direction of the target based on the average response of the azimuth jitter and the average response of the elevation jitter. Example display of average pointing direction of the target is explained in detail with reference to FIG. 1B. Furthermore, the IMU 106 generates an output signal 113 to compensate for the movement of the firearm 102 based on the average response of the azimuth jitter and the average response of the elevation jitter. In one example, the output signal 113 may be generated when the average response of the azimuth jitter coincides with the azimuth jitter and the average response of the elevation jitter coincides with the elevation jitter, at the same time.

The IMU 106 provides the output signal 113 to the firing actuation unit 110. The firing actuation unit 110 may be communicatively coupled to the IMU 106. In operation, the firing actuation unit 110 may delay the fire command 112 triggered by an operator based on the output signal 113. The fire command 112 may be generated when the user squeezes the firearm trigger 108 of the firearm 102. Further, the firing actuation unit 110 delays the fire command 112 based on actuating firing of the firearm 102 when the average response of the azimuth jitter and the average response of the elevation jitter substantially coincide with the azimuth jitter and the elevation jitter, respectively. The delayed fire command 114 may compensate the movement of the firearm 102, thereby the fired object (e.g., a bullet) may hit the target with increased accuracy.

FIG. 1B illustrates an example schematic 100B showing an average pointing direction 124 upon processing the azimuth jitter 116 and the elevation jitter 118 by the IMU 106. The IMU 106 may determine the azimuth jitter 116 and the elevation jitter 118 and computes an average response of the azimuth jitter 120 and the average response of the elevation jitter 122. In one example, an average pointing direction 124 may be computed from the average response of the azimuth jitter 120 and the average response of the elevation jitter 122 and the average pointing direction 124 can be displayed on the firearm sight 104.

In the example shown in FIG. 1B, the azimuth jitter 116 and the elevation jitter 118 of the firearm may result in scattered pointing direction 126 of the aiming point (i.e., aim points that are scattered across the target) on the firearm sight 104. Also FIG. 1B depicts an average pointing direction 124 of the firearm 102, computed based on the average response of the azimuth jitter 120 and the average response of the elevation jitter 122.

FIG. 1C is an example graphical representation 100C showing firing events (1 to 4) of the firearm 102 after compensating for the movement of the firearm 102. The IMU 106 provides the output signal 113 to the firing actuation unit 110 (not shown in FIG. 1C). The time by which the fire command 112 (as shown in FIG. 1A) has to be delayed is determined based on the output signal 113. The output signal 113 actuates the firing of the firearm 102 when the average response of the azimuth jitter 120 coincides with the azimuth jitter 116 and the average response of the elevation jitter 122 coincides with the elevation jitter 118, at the same time. FIG. 1C shows at the example firing events 1, 2, 3 and 4 at points where the average response of the azimuth jitter 120 coincides with the azimuth jitter 116, and the average response of the elevation jitter 122 coincides with the elevation jitter 118.

Figure 2:
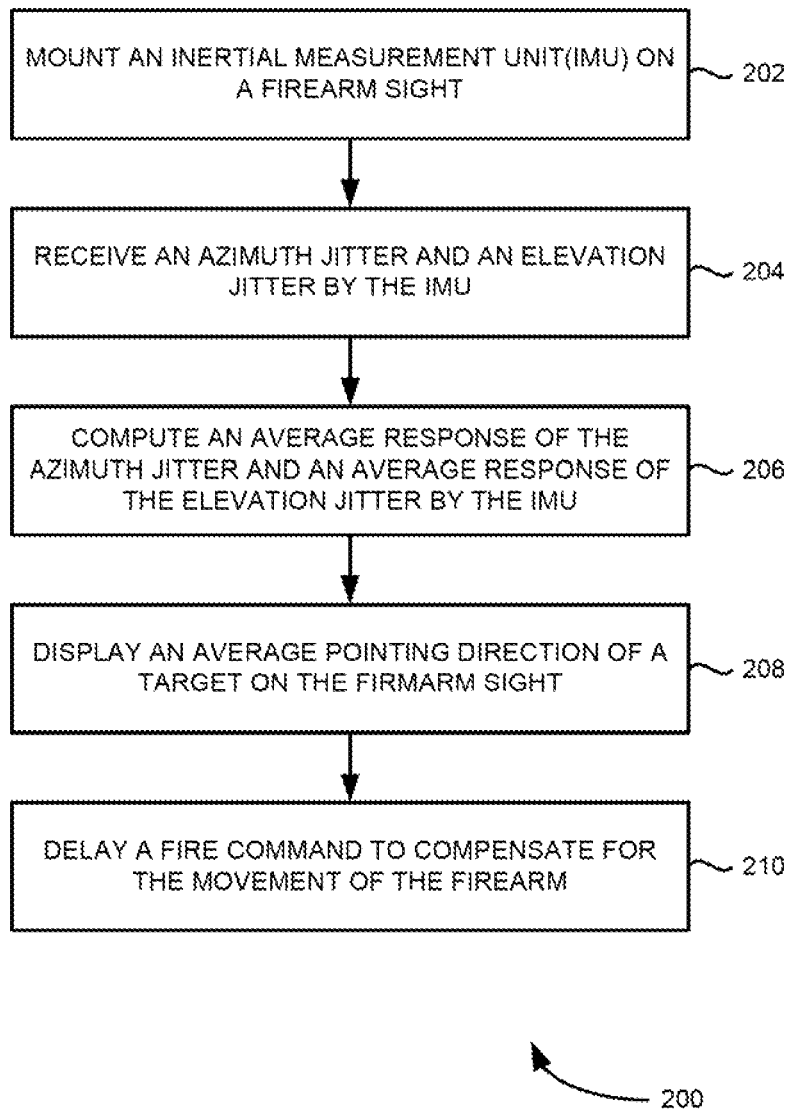
FIG. 2 is an example flowchart for compensating movement of a firearm.

FIG. 2 illustrates the example flowchart 200 for compensating movement of the firearm. At step 202, an inertial measurement unit (IMU) mourned on the firearm sight of the firearm is provided. At step 204, an azimuth jitter and an elevation jitter associated with the movements of the firearm are determined by the IMU. The movement of the firearm may be caused due to parameters such as breathing of aimer, muscle fatigue of the aimer, continuous compensation for weight of the firearm, and/or wind. In one example, the azimuth jitter and the elevation jitter are computed based on an azimuth angle and an elevation angle of the firearm, respectively. At step 206, an average response of the azimuth jitter and an average response of the elevation jitter may be computed by the IMU.

At step 208, an average pointing direction of the target may be displayed on the firearm sight based on the average response of the azimuth jitter and the average response of the elevation jitter. Further at step 210, a fire command is delayed to compensate for the movement of the firearm based on the average response of the azimuth jitter and the average response of the elevation jitter. For example, a fire command may be triggered by a user/aimer using the firearm trigger. Further, the fire command triggered by the user is actuated when the average response of the azimuth jitter and the average response of the elevation jitter substantially coincide with the azimuth jitter and elevation jitter, respectively, thereby causing a delay in the fire command. This delay compensates for any movements of the firearm and improving the target accuracy of the firing.

Figure 3:
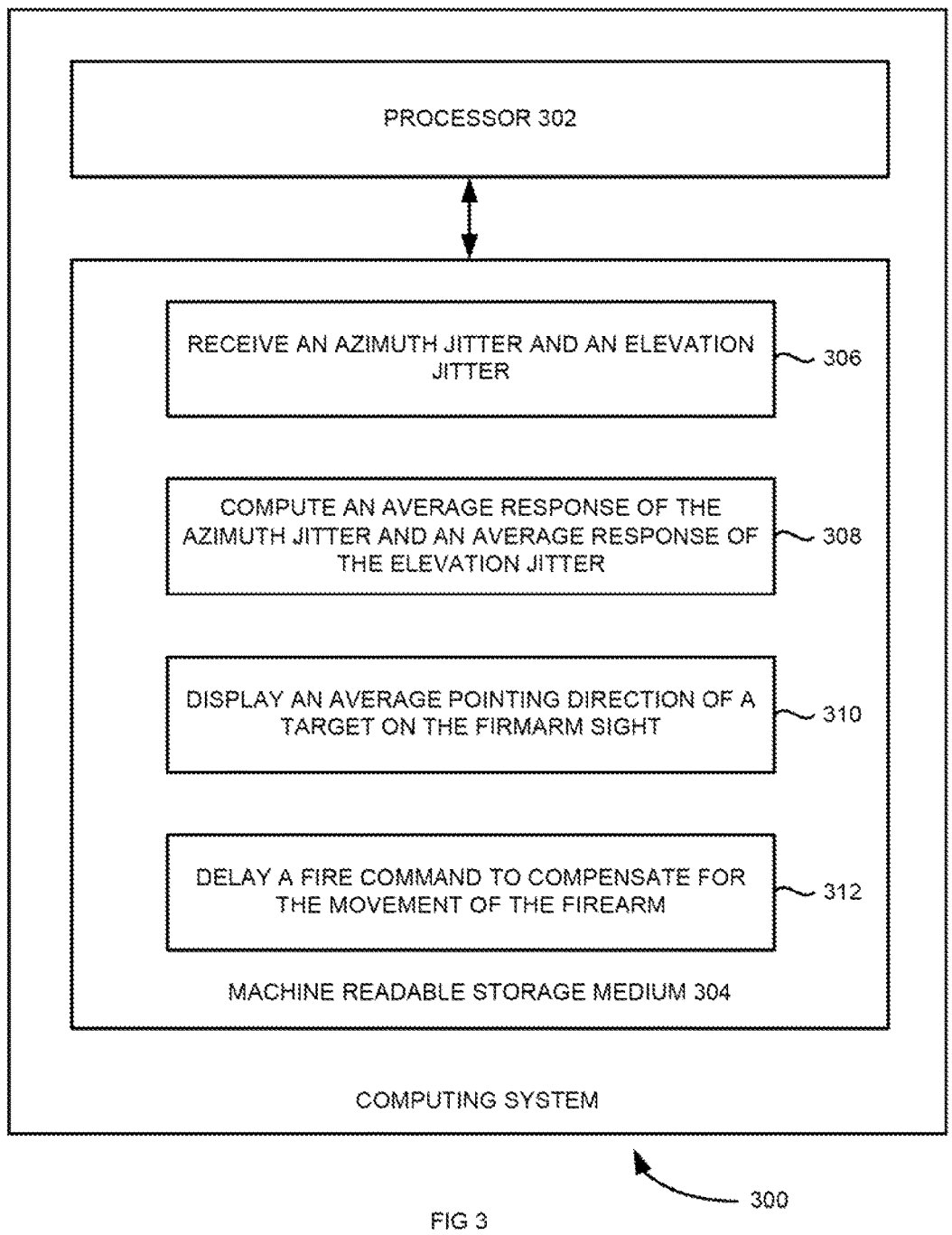
FIG. 3 is block diagram of an example physical computing system including the IMU functionality.

FIG. 3 illustrates a block diagram of an example computing system 300 for compensating movement of the firearm. The computing system 300 includes a processor 302 and a machine-readable storage medium 304 communicatively coupled through a system bus. The processor 302 may be any type of central processing unit (CPU), microprocessor, or processing logic that interprets and executes machine-readable instructions stored in the machine-readable storage medium 304. The machine-readable storage medium 304 may be a random access memory (RAM) or another type of dynamic storage device that may store information and machine-readable instructions that may be executed by the processor 302. For example, the machine-readable storage medium 304 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, the machine-readable storage medium 304 may be a non-transitory machine-readable medium. In an example, the machine-readable storage medium 304 may be remote but accessible to the computing system 300.

The machine-readable storage medium 304 may store instructions 306-312. In an example, instructions 306-312 may be executed by the processor 302 for compensating movement of the firearm.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

The above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The present description has been shown and described with reference to the foregoing examples. It is understood, however, that other forms, details, and examples can be made without departing from the spirit and scope of the present subject matter that is defined in the following claims.

What is claimed is:

1. A firearm comprising:
a firearm sight fixed to the firearm;
an inertial measurement unit (IMU) mounted on the firearm sight, the inertial measurement unit (IMU) having movement detection elements which detect movement of the firearm from a set firing position of the firearm and continuously transmit movement signals to the inertial measurement unit (IMU), the inertial measurement unit (IMU) configured to be activated by an operator to:
determine a current aim point of the firearm based on a current azimuth angle and a current elevation angle which result from the movement of the firearm from the set firing position, the current azimuth angle being a measure of the movement of the firearm in a horizontal plane and the current elevation angle being a measure of the movement of the firearm in a vertical plane and based on the movement signals;
compute an average azimuth angle based on the current azimuth angle, and compute an average elevation angle based on the current elevation angle, an average pointing direction of the firearm is computed based on the average azimuth angle and the average elevation angle; and
generate an output signal based on a comparison between the current aim point of the firearm and the average pointing direction of the firearm;
a firearm trigger which is triggered to issue a fire command; and
a firing actuation unit communicatively coupled to the firearm trigger and the inertial measurement unit (IMU) to delay the fire command based on the output signal.

2. The firearm of claim 1, wherein the firing actuation unit delays the fire command, which was issued by the firearm trigger, until the current azimuth angle and the current elevation angle, after the fire command has been issued, substantially coincide with the average azimuth angle and the average elevation angle, respectively.

3. The firearm of claim 1, wherein
the firearm sight is configured to display an average pointing direction of a target based on the average response of the azimuth jitter and the average response of the elevation jitter.

4. The firearm of claim 1, wherein an azimuth jitter and an elevation jitter are determined based on the movement signals which are based on the azimuth angle and the elevation angle of the firearm, respectively.

5. The firearm of claim 1, wherein the firing actuation unit is configured to delay the fire command triggered by the operator based on the output signal, and the firing actuation unit is configured to actuate the firing command when the current azimuth angle substantially coincides with the average azimuth angle and the current elevation angle substantially coincides with the average elevation angle.

6. The firearm of claim 1, wherein the movement of the firearm, which is caused due to parameters selected from the group consisting of breathing of the operator, muscle fatigue of the operator, continuous compensation for weight of the firearm, and wind, is computed based on the azimuth angle of the firearm and the elevation angle of the firearm.

7. The firearm of claim 1, wherein
the firearm sight is fixed to the firearm to facilitate viewing of a target, and the inertial measurement unit is configured to be activated by the operator to select the set firing position of the firearm relative to the target, and the firearm sight facilitates alignment of the current aim point of the firearm relative to the target;
the movement detection elements detect movement of the current aim point of the firearm relative to the set firing position, and the movement of the aim point corresponds to the movement of the firearm;

the inertial measurement unit (IMU) is communicatively coupled to the movement detection elements so as to receive the transmitted movement signals from the movement detection elements, the inertial measurement unit (IMU) comprises a computing system which continually determines the current azimuth fitter angle and the current elevation angle from a time the set aim point of the firearm was selected relative to the target, the computing system repetitively averages the current azimuth angle to determine the average azimuth angle, and averages the current elevation angle to determine the average elevation angle, the computing system generates the output signals based on repetitive comparisons of the current azimuth angle with the average azimuth angle and a comparison of the current elevation angle with the average elevation angle, and the inertial measurement unit (IMU) transmits the output signals to the firing actuation unit; and the firing actuation unit receives the fire command and the output signals from the inertial measurement unit (IMU) and delays discharge of the firearm until the output signals indicate that the current azimuth angle at least substantially equals the average azimuth angle and the current elevation angle at least substantially equals the average elevation angle.

8. A method for compensating movement of a firearm, the method comprising:

providing an inertial measurement unit (IMU) mounted on a firearm sight which is fixed to the firearm;

detecting movement of the firearm from a set firing position of the firearm with movement detection elements which continuously transmit movement signals to the inertial measurement unit (IMU), the inertial measurement unit being activated by an operator;

determining, by the inertial measurement unit MU', a current aim point of the firearm based on a current azimuth angle and a current elevation angle which result from the movement of the firearm from the set firing position, the current azimuth angle being a measure of the movement of the firearm in a horizontal plane and the current elevation angle being a measure of the movement of the firearm in a vertical plane and based on the movement signals;

computing, by the inertial measurement unit (IMU), an average azimuth angle based on the current azimuth angle, and computing an average elevation angle based on the current elevation angle, an average pointing direction of the firearm is computed based on the average azimuth angle and the average elevation angle;

generating, with the inertial measurement unit (IMU), an output signal based on a comparison between the current aim point of the firearm and the average pointing direction of the firearm;

actuating a firearm trigger to issue a fire command; and delaying, with a firing actuation unit, the fire command to compensate for the movement of the firearm, based on the output signal, the firing actuation unit being communicatively coupled to the inertial measurement unit MU' and the firearm trigger.

9. The method of claim 8, wherein delaying, with the firing actuation unit, the fire command to compensate for the movement of the firearm based on the output signal; and actuating, with the firing actuation unit, firing of the firearm when current azimuth angle and the current elevation angle substantially coincide with the average azimuth angle and the average elevation angle, respectively.

10. The method of claim 8, further comprising:

displaying the average pointing direction of the firearm on the firearm sight based on the average azimuth angle and the average elevation angle.

11. The method of claim 8, wherein an azimuth jitter and an elevation jitter are computed based on the movement signals which are based on the azimuth angle and the elevation angle of the firearm, respectively.

12. The method of claim 8, wherein the firing actuation unit is configured to actuate the firing command when the current azimuth angle substantially coincides with the average azimuth angle and the current elevation angle substantially coincides with the average elevation angle.

13. The method of claim 8, wherein the movement of the firearm, which is caused due to parameters selected from the group consisting of breathing of the operator, muscle fatigue of the operator, continuous compensation for weight of the firearm, and wind is computed based on the current azimuth angle and the current elevation angle.

* * * * *